United States Patent
Mintz et al.

[11] Patent Number: 5,413,148
[45] Date of Patent: May 9, 1995

[54] CASING STRUCTURE FOR ENCASING MEAT PRODUCTS

[76] Inventors: Marcus Mintz, 5040 Hampton Ave., Montreal, Quebec, Canada, H3X 3P7; Neil Mintz, 3101 Del Rey Ave., Carlsbad, Calif. 92009

[21] Appl. No.: 177,800

[22] Filed: Jan. 6, 1994

Related U.S. Application Data

[63] Continuation of Ser. No. 886,280, May 20, 1992, abandoned, which is a continuation-in-part of Ser. No. 838,355, Feb. 19, 1992, abandoned.

[51] Int. Cl.⁶ .................... F16L 11/00; A22C 13/00
[52] U.S. Cl. .................... 138/118.1; 428/34.8; 428/36.1
[58] Field of Search .............. 138/118.1, 123, 124; 428/36, 158, 159, 34.1, 34.3, 34.8; 426/105; 66/178 R, 180, 181, 201, 202

[56] References Cited

U.S. PATENT DOCUMENTS

| | | | |
|---|---|---|---|
| 698,499 | 4/1902 | Hirner | 66/180 |
| 1,505,218 | 8/1924 | Sartori | 452/35 |
| 1,981,057 | 11/1934 | Lombardi | 66/180 |
| 2,289,302 | 7/1942 | Bradshaw | 66/195 |
| 2,366,710 | 1/1945 | Dimond | 138/118.1 |
| 2,375,474 | 5/1945 | Holmes et al. | 66/180 |
| 2,500,759 | 3/1950 | Largman | 66/180 |
| 2,977,782 | 4/1961 | Sheek | 66/178 R |
| 3,159,990 | 12/1964 | Monday | 66/180 |
| 3,448,595 | 6/1969 | Baltzer et al. | 66/195 |
| 3,639,130 | 2/1972 | Eichin et al. | 138/118.1 |
| 4,621,482 | 11/1986 | Crevasse et al. | 53/439 |
| 4,690,843 | 9/1987 | Inagaki | 138/118.1 |
| 4,967,798 | 11/1990 | Hammer et al. | 426/105 X |
| 5,043,194 | 8/1991 | Siebrecht et al. | 428/34.8 |

FOREIGN PATENT DOCUMENTS

| | | | |
|---|---|---|---|
| 726424 | 1/1966 | Canada | 53/439 |
| 0303328 | 2/1989 | European Pat. Off. | |
| 106965 | 5/1984 | Germany | 138/118.1 |
| 7614318 | 7/1977 | Netherlands | |
| 9001395 | 1/1992 | Netherlands | |
| 594359 | 9/1977 | Switzerland | |
| WO9010576 | 9/1990 | WIPO | |

*Primary Examiner*—David A. Scherbel
*Assistant Examiner*—Patrick F. Brinson
*Attorney, Agent, or Firm*—Fishman, Dionne & Cantor

[57] ABSTRACT

A stockinette member is formed of closely knit or woven threads. A netting arrangement is integrally formed with the stockinette member. The netting arrangement may either be knit in with the stockinette member or the strands of the netting arrangement may be laid in.

8 Claims, 3 Drawing Sheets

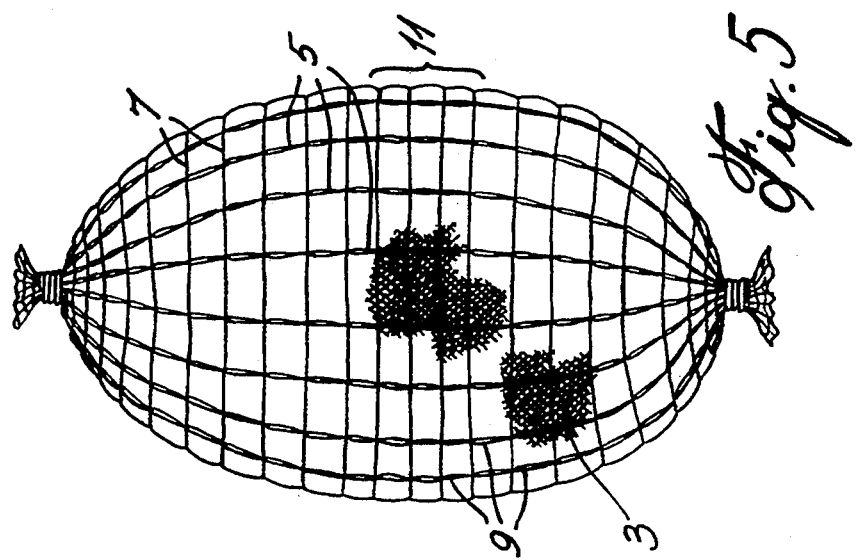
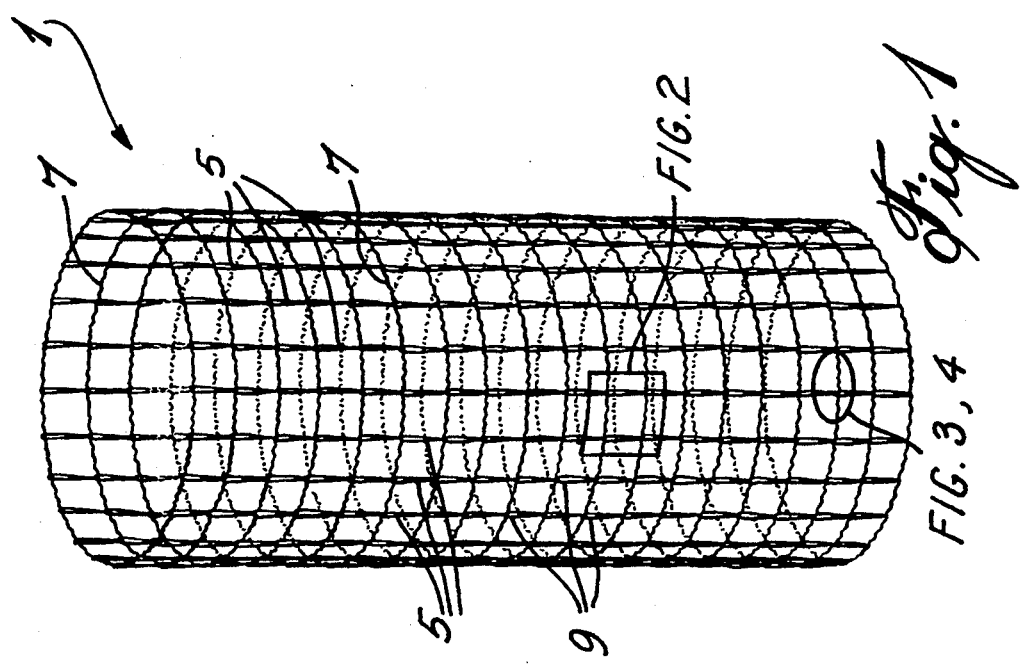

CASING STRUCTURE FOR ENCASING MEAT PRODUCTS

CROSS-REFERENCE TO RELATED APPLICATION

This is a continuation of application Ser. No. 07/886,280 file on May 20, 1992, now abandoned, which is a continuation-in-part of application Ser. No. 07/838,355 filed on Feb. 19, 1992 now abandoned.

BACKGROUND OF INVENTION

1. Field of the Invention

The invention relates to a casing structure for encasing meat products. More specifically, the invention relates to such a casing structure which comprises a stockinette with an integrally formed netting arrangement.

2. Description of Prior Art

It is known in the meat encasing art to encase meat and poultry products, especially during the cooking and/or smoking process, such as hams, poultry and the like, in netting arrangements. Such netting arrangements typically comprise a plurality of equally sized squares made of cotton or poly, and an elasticized strand material in the tubular form. The meat products are stuffed into the tubes such that the elasticized material is under tension, and the two ends of the tube of netting are then closed.

Because the meat product is stuffed into the tube with the elasticized material under tension, the strands tend to push back into the meat product to form squared indentations on the outer surface of the meat product. The meat product bulges out between the strands on either side of the indentations giving a desirable "checkerboard" pattern on the surface.

One of the problems in the art is that the product which bulges out between the strands can also bulge laterally whereby they will overlap, and cover, at least some of the strands. This makes it difficult to peel the netting off the meat product, especially when the bulges on either side of the strand bulge towards each other.

In the latter case, and taking into account the fact that the meat product contains binding materials, when the bulges on either side of a strand, bulging towards each other, physically contact each other, they can bind together so that it will be necessary to break the surface of the meat product at the binding points to peel the netting off the surface of the meat product.

One solution to these problems is to use a collagen film in association with the netting arrangement. The collagen film underlies the netting and overlies the outer surface of the meat product. The collagen film provides some restrictions on the bulging meat as it will permit the underlying meat product to bulge only upwardly, but it will substantially prevent the meat product from bulging laterally, so that the elasticized strands forming the netting will not be covered by laterally spreading bulges, thereby preventing the binding of the meat product to the netting. The binding of the meat is to the collagen. The meat product is sold to the consumer with the collagen covering. In addition, the intervention of the collagen film will prevent the bulges from binding to each other.

While the collagen film overcomes the above problems, it presents a different problem, namely, high costs. Collagen film, on a per unit basis, costs approximately four times as much as the netting arrangement so that the cost of casing meat products using a collagen film and netting arrangement combination is seriously increased.

In addition, when the collagen film is used, air bubbles can form between the outer surface of the meat product and the collagen film. This causes an unattractive appearance in the meat product, especially when the meat product is cooked.

To overcome the above problems, a stockinette has been devised which takes the place of a collagen film in the above-described combination. The stockinette is a closely knit or closely woven tubular member knit or woven of threads comprising, for example, cotton, polyester, nylon or other suitable materials. Because the stockinette is knit or woven, it is stretchable and has openings. As it is closely knit or woven, the openings are very small. This finely knit stockinette acts to restrict the meat particles from penetrating through, thereby resisting the stockinette to be stuck to the meat product. However, the stockinette is porous enough to have the benefit of allowing easy smoke penetration into the meat product. Additionally, the stockinette can be treated with various solutions (for example, liquid smoke, oils, acid solutions, etc.), or coated with a film (for example, cellulose), to further enhance the peelability, if required. Also with the stockinettes, air bubbles between the outer surface of the meat product and the stockinette are substantially eliminated. In addition, the cost of the stockinette per unit is substantially less than the cost of the collagen film.

However, the stockinette and netting arrangement combination is still relatively expensive, and it also requires a two-step stuffing process, i.e., the meat product is first stuffed in the stockinette and then the meat product and stockinette are stuffed into the netting arrangement.

SUMMARY OF INVENTION

It is therefore an object of the invention to provide a casing structure for encasing meat products which overcomes the disadvantages of prior art casing structures.

It is a more specific object of the invention to provide such a casing structure which incorporates both the netting arrangement function for appearance and the ability to be easily removed from the meat after cooking.

In accordance with the invention, the casing structure comprises a stockinette member with an integrally formed netting arrangement.

The stockinette member is produced in tubular form.

The netting arrangement may be formed of elasticized strands or knitted or woven strands.

In accordance with the invention there is provided an elongated tubular casing structure for encasing meat products, the elongated structure having a longitudinal direction and a transverse lateral direction. The casing structure of the invention comprises:

a stockinette member comprising a closely knit tubular member formed of closely knit threads and having a first stretch capacity a knitted netting arrangement having a second stretch capacity and comprising a first plurality of spaced strands extending in the longitudinal direction and a second plurality of spaced strands extending in the lateral direction;

the longitudinal and lateral strands of the netting arrangement each intersecting in locking engagement with one another to form a grid-like pattern comprising a plurality of four-sided shapes;

the strands of the netting arrangement being knit into the threads of the stockinette member, whereby the netting arrangement and the stockinette member are integrally formed so that the casing structure comprises an integrally formed structure;

the first stretch capacity being greater than the second stretch capacity;

whereby, when a meat product is stuffed into the casing structure under pressure, the meat product forms a bulge within each of the four-sided shapes to thereby define a checker-board pattern on the surface thereof, the stockinette member forming a shield to prevent the adherence of adjacent meat product bulges over the strands of the netting arrangement.

BRIEF DESCRIPTION OF DRAWINGS

The invention will be better understood by an examination of the following description, together with the accompanying drawings in which:

FIG. 1 illustrates one embodiment of a casing structure in accordance with the invention;

FIG. 5 illustrates how the casing structure looks when stuffed with the meat product.

DESCRIPTION OF PREFERRED EMBODIMENTS

Referring to the single drawing, a casing structure in accordance with the invention, illustrated generally at 1, comprises a stockinette 3 formed of closely knit or woven threads. The threads may comprise cotton, polyester, nylon or other suitable materials. As can be seen, the stockinette is tubular in shape.

Formed integrally with the stockinette are equally spaced longitudinal strands 5 and equally spaced lateral strands 7. The strands may comprise elasticized material laid into the stockinette. In a particular embodiment, the elasticized material comprises rubber which is laid in under tension. The longitudinal strands may be laid in every twelve stitches while the lateral strands may be laid in every 12 courses. Thus, the netting arrangement consisting of the strands 5 and 7 is integrally formed with the stockinette to form the inventive casing structure.

In an alternate embodiment, the strands of the netting arrangement are knit into the stockinette of the same threads which form the stockinette. To form the lateral strands 7 of the netting arrangement in the latter embodiment, twelve loose courses are first knit and then two tighter courses. The twelve loose courses comprise the stockinette while the two tighter courses comprise a lateral strand of the netting arrangement. By making the courses tighter, the strand thus formed is less elastic than the strands of the looser courses.

The above is repeated over fourteen course cycles so that each lateral strand of the netting arrangement is separated from adjacent strands by fourteen courses. As shown, the longitudinal strands 5 and lateral strands 7 cross each other to form square or four-sided shapes.

To form the longitudinal strands, the machine is set so that it knits three courses on high butt only and a fourth course on both low butt and high butt. One way of doing this is, of course, to have four cams, three of which are set on high butt and one of which is set on both low butt and high butt. The needles are then arranged so that a predetermined number are set on high butt and a smaller predetermined number are set on low butt. For example, twenty needles could be set on high butt and two on low butt. This cycle is repeated all around each course.

With this arrangement, the two needles set on low butt will cast off only every fourth course so that, in each cycle of twenty-two stitches, twenty will be knit on every course and two will be knit on every fourth course only. The two latter stitches will form the longitudinal strands of the netting arrangements which will accordingly be separated from each other by twenty of the former stitches.

As will be obvious, the spacing between both longitudinal and lateral strands would be varied according to need. The spacing given in the examples above was only to provide a clearer description, and the invention is not restricted to the above spacing.

Figure 2:
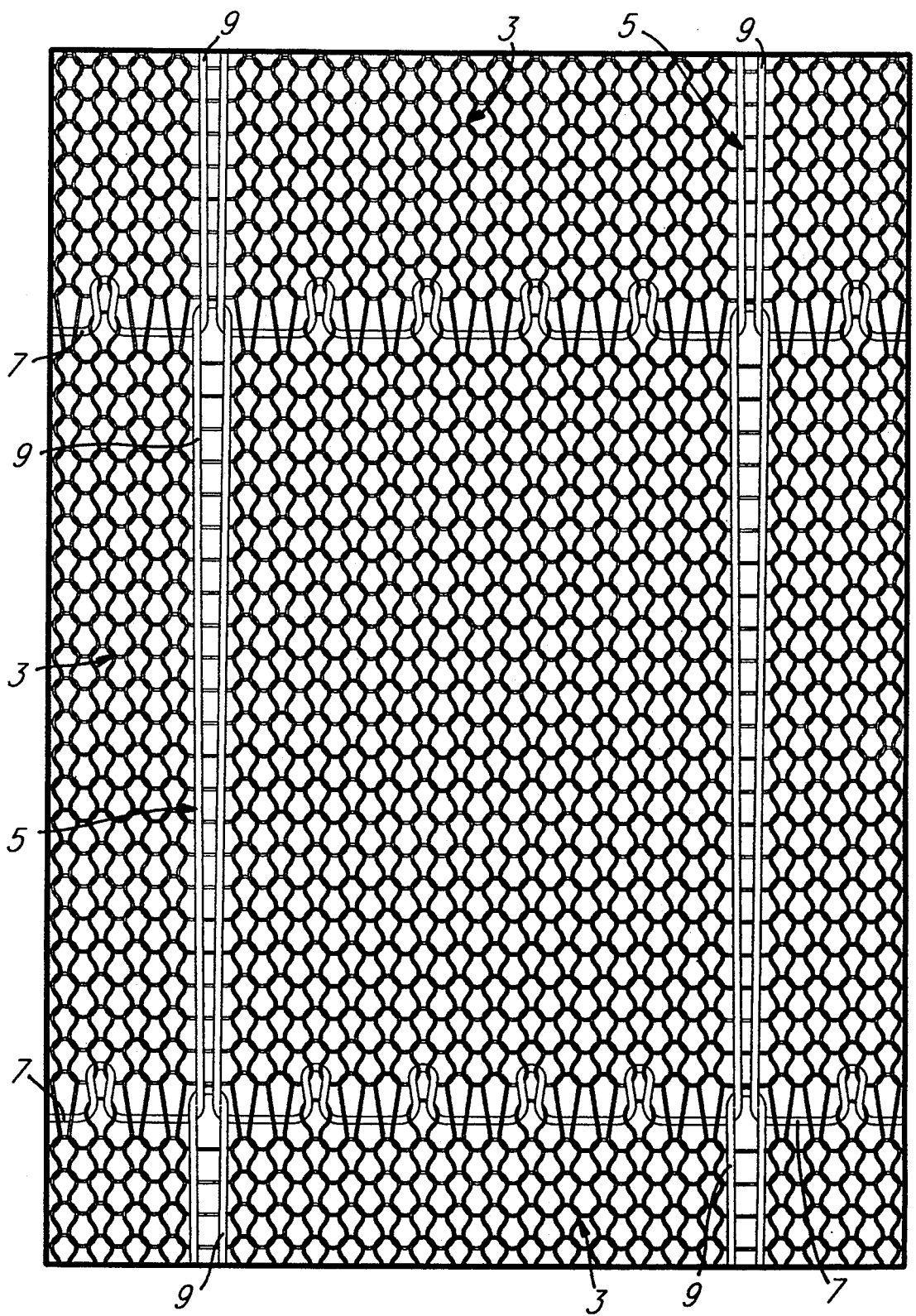
FIG. 2 is a blow-up of a portion of FIG. 1 illustrating a second embodiment of the invention.
Figure 3:
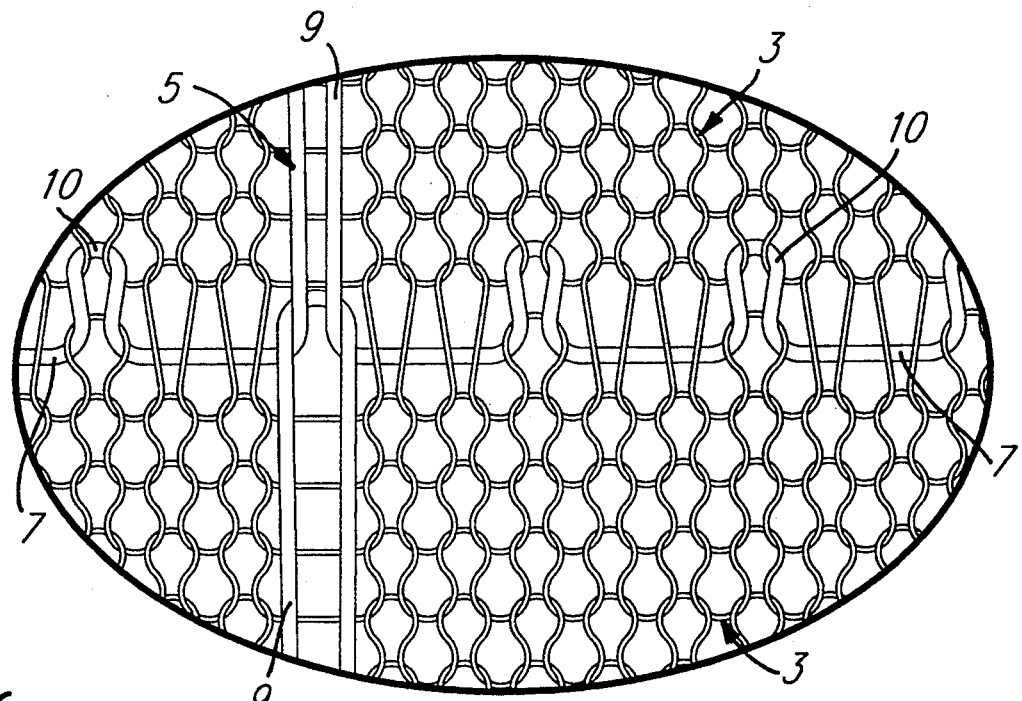
FIG. 3 is a blown-up view of a portion of FIG. 1 showing the lateral strand in its rest position.
Figure 4:
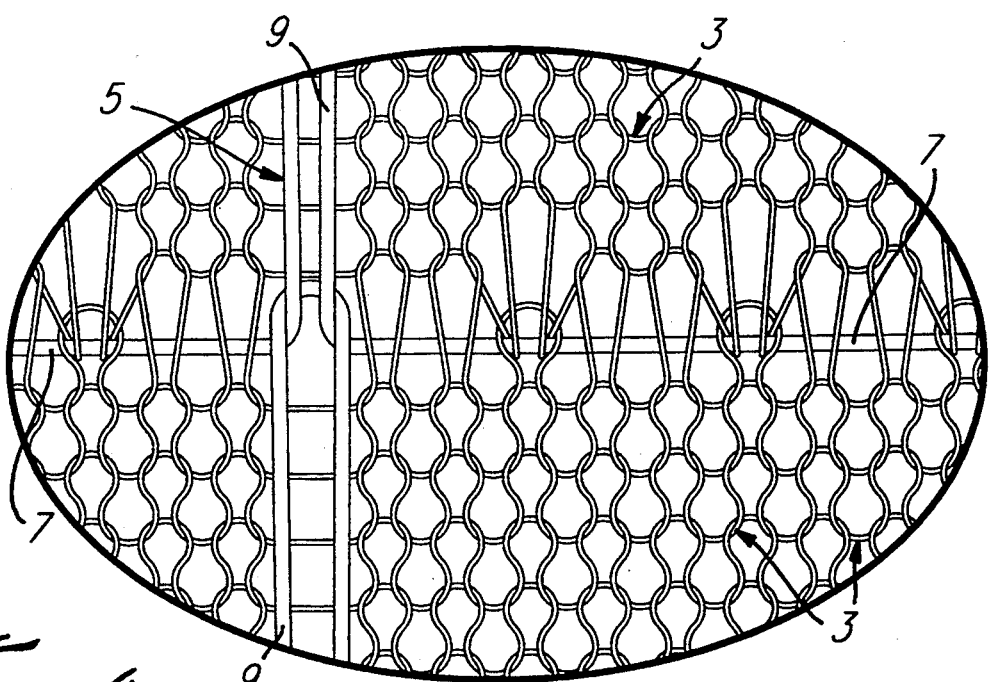
FIG. 4 is the same view as FIG. 3 but showing the lateral strand in its "stretched" position.

Turning now to FIG. 2, in accordance with a further embodiment of the invention, each of the lateral strands 7 includes a plurality of loops 9 extending in the longitudinal direction. As can also be seen, each loop is interlaced with an adjacent preceding loop and an adjacent following loop, and the interlaced aligned loops form the longitudinal strands 5. The material for forming the strands in the FIG. 2 embodiment can be made of either elasticized or non-elasticized yarn.

As the same yarns are creating both the lateral and longitudinal strands, when the netting arrangement is pulled in the lateral direction (i.e., at the larger diameter portion of the meat product), then the loops 9 will shorten (shown generally at 11 in FIG. 5) and the remainder of the lateral lengths will lengthen, so that a certain amount of stretch is provided even if non-elastic material is used in the formation of the netting arrangement. As seen in FIG. 5, this versatility allows for a naturally shaped product to be formed, in which the center of the meat product has a larger diameter than the ends.

The finely knit stockinette is knit so that it stretches more than the integrally formed netting arrangement so that the meat will be forced to bulge outwardly between the lateral and longitudinal strands, when the casing structure is applied with pressure onto the meat product.

The following is an example of how to construct the casing structure as illustrated in FIG. 2 using arbitrary variables:

Example

Using a 24 feed, 3 track jersey single knit machine consisting of 400 needles.

Feed #1 feeds the heavy yarn (from which the square netting pattern will be formed).

Feeds #2-24 feed the fine yarns (from which the tightly knit stockinette will be formed).

A set of needles are selected at the positions that a longitudinal strand is desired. For example, if 25 evenly spaced longitudinal strands are desired, every 16th needle will be selected (440/25=16). We will call this needle set "A" (needle #1, 16, 32, 48 . . . 384).

Needle set "A" will knit only on Feed #1. Needle set "A" will not knit on Feeds 2–24; i.e., welt stitch. However, all needles but set "A" will knit on Feeds 2–24.

At Feed #1, in addition to needle set "A", additional needles can be selected to knit (alternatively can be laid in) the heavy yarn into stockinette 3, forming the lateral strands 7. This is done to draw in more of the heavy yarn as is required depending on the size of the product required. This same heavy yarn is, of course, acting as both the longitudinal and lateral strands 5 and 7.

This additional set of needles can, for example, consist of every third needle; i.e., needle #4, 7, 10, 13 ... ). Even though these needles are creating stitch loops 10 as seen in diagram #3, it is essential that when the meat product is stuffed firmly into the netting, the heavy yarn will be pulled tight causing these little loops to disappear (see diagram #4) so that the heavy yarn will be firmly pressed against the product.

The finely knit stockinette 3 is intentionally sized larger (i.e., can be stretched more) than the integrally formed netting pattern to allow the meat to bulge through the large square openings while the net pattern actually restricts the product, thereby being the determining factor of the product size.

The stockinette 3 would also be intentionally a size larger than the integrally formed netting pattern in the FIG. 1 embodiment for the same reasons.

The casing structure may be coated with a liquid such as liquid smoke a-non-toxic, acid solution (e.g., vinegar) or oils etc. The casing structure may also be coated with a smoke permeable film, for example, cellulose.

Although particular embodiments have been described, this was for the purpose of illustrating, but not limiting, the invention. Various modifications, which will come readily to the mind of one skilled in the art, are within the scope of the invention as defined in the appended claims.

We claim:

1. An elongated tubular casing structure for encasing meat products, said elongated structure having a longitudinal direction and a transverse lateral direction, said casing structure comprising:
    a stockinette member comprising a closely knit tubular member formed of closely knit threads and having a first stretch capacity;
    a knitted netting arrangement having a second stretch capacity and comprising a first plurality of spaced strands extending in said longitudinal direction and a second plurality of spaced strands extending in said lateral direction;
    the longitudinal and lateral strands of said netting arrangement each intersecting in locking engagement with one another to form a grid-like pattern comprising a plurality of four-sided shapes;
    said strands of said netting arrangement being knit into the threads of said stockinette member, whereby said netting arrangement and said stockinette member are integrally formed so that said casing structure comprises an integrally formed structure;
    said first stretch capacity being greater than said second stretch capacity;
    whereby, when a meat product is stuffed into said casing structure under pressure, said meat product forms a bulge within each of said four-sided shapes to thereby define a checker-board pattern on the surface thereof, said stockinette member forming a shield to prevent the adherence of adjacent meat product bulges over said strands of said netting arrangement.

2. A casing structure as defined in claim 1 wherein said longitudinal and lateral strands comprise elasticized material.

3. A casing structure as defined in claim 2 wherein each said lateral strand comprises a plurality of loops, each of said loops extending in sad longitudinal direction.

4. A casing structure as defined in claim 3 wherein each loop is interlaced with an adjacent preceding loop and an adjacent following loop;
    whereby to form a plurality of aligned interlaced loops;
    each longitudinal strand comprising one of said aligned interlaced loops.

5. A casing structure as defined in claim 2 wherein the threads of said stockinette member and the strands of said netting arrangement are coated with a liquid selected from the group consisting of liquid smoke, non-toxic acid solutions and oils.

6. A casing structure as defined in claim 4 wherein the threads of said stockinette member and the strands of said netting arrangement are coated with a liquid selected from the group consisting of liquid smoke, non-toxic acid solutions and oils.

7. A casing structure as defined in claim 2 wherein the threads of said stockinette member and the strands of said netting arrangement are coated with a smoke permeable film.

8. A casing structure as defined in claim 4, wherein the threads of said stockinette member and the strands of said netting arrangement are coated with a smoke permeable film.

* * * * *

UNITED STATES PATENT AND TRADEMARK OFFICE
CERTIFICATE OF CORRECTION

PATENT NO. : 5,413,148

DATED : May 9, 1995

INVENTOR(S) : Marcus Mintz et al

It is certified that error appears in the above-identified patent and that said Letters Patent is hereby corrected as shown below:

Col. 6, line 23, Delete "claim 2" and insert therefor --claim 1--.

Col. 6, line 23, Delete "claim 2" and insert therefor --claim 1--.

Col. 6, line 44, Delete "claim 2" and insert therefor --claim 1--.

Signed and Sealed this

Twentieth Day of February, 1996

BRUCE LEHMAN

*Commissioner of Patents and Trademarks*

Attest:

*Attesting Officer*

UNITED STATES PATENT AND TRADEMARK OFFICE
CERTIFICATE OF CORRECTION

PATENT NO. : 5,413,148
DATED : May 9, 1995
INVENTOR(S) : Marcus Mintz et al

It is certified that error appears in the above-identified patent and that said Letters Patent is hereby corrected as shown below:

Col. 6, Line 23  Delete "claim 2" and insert therefor --claim 1--.

Col. 6, Line 34  Delete "claim 2" and insert therefor --claim 1--.

Col. 6, Line 44  Delete "claim 2" and insert therefor --claim 1--.

This certificate supersedes Certificate of Correction issued February 20, 1996.

Signed and Sealed this

Twenty-third Day of July, 1996

Attest:

BRUCE LEHMAN

*Attesting Officer*   *Commissioner of Patents and Trademarks*